United States Patent
Bills et al.

(10) Patent No.: US 6,945,119 B2
(45) Date of Patent: Sep. 20, 2005

(54) APPARATUS AND METHODS FOR HEAT LOSS PRESSURE MEASUREMENT

(75) Inventors: Daniel G. Bills, Boulder, CO (US); Michael D. Borenstein, Boulder, CO (US)

(73) Assignee: Helix Technology Corporation, Mansfield, MA (US)

( * ) Notice: Subject to any disclaimer, the term of this patent is extended or adjusted under 35 U.S.C. 154(b) by 0 days.

(21) Appl. No.: 10/852,896

(22) Filed: May 24, 2004

(65) Prior Publication Data

US 2004/0216527 A1 Nov. 4, 2004

Related U.S. Application Data

(60) Continuation of application No. 10/273,402, filed on Oct. 16, 2002, which is a continuation-in-part of application No. 09/583,339, filed on May 31, 2000, now Pat. No. 6,658,941, which is a continuation-in-part of application No. 09/475,392, filed on Dec. 30, 1999, now Pat. No. 6,227,056, which is a division of application No. 08/897,629, filed on Jul. 21, 1997, now Pat. No. 6,023,979.

(51) Int. Cl.[7] .............................................. G01L 21/12
(52) U.S. Cl. ........................ 73/755; 73/19.05; 73/23.2
(58) Field of Search ...................... 73/755, 23.2–23.29, 73/700, 19.01–19.1, 25.01–25

(56) References Cited

U.S. PATENT DOCUMENTS

| 1,448,540 | A |   | 3/1923  | Houskeeper |
| 1,668,106 | A |   | 5/1928  | Dällenbach |
| 1,778,508 | A |   | 10/1930 | Peoples |
| 1,873,984 | A |   | 8/1932  | Sieber |
| 2,650,496 | A | * | 9/1953  | Middleton ............... 73/204.15 |
| 2,938,387 | A |   | 5/1960  | Hamilton |
| 3,199,356 | A |   | 8/1965  | Andriulis |

(Continued)

FOREIGN PATENT DOCUMENTS

| DE | 1094341      | 12/1960 |
| DE | 1648592      | 4/1971  |
| EP | 0 893 677 A1 | 1/1999  |
| GB | 2105047      | 3/1983  |
| GB | 2105472      | 3/1983  |
| GB | 2 368 647 A  | 5/2002  |
| SU | 1 675 710 A1 | 9/1991  |
| WO | WO 97/41414  | 11/1997 |

OTHER PUBLICATIONS

Milner, C.J., "Fast, thermostatic Pirani gauge," *Rev. Sci. Instrum.* 54(7): 890–893 (Jul. 1983).

Alvesteffer, W. J., et al., "Miniaturized thin film thermal vacuum sensor" *J. Vac. Sci. Technol. A* 13(6), 2980–2985 (Nov./Dec. 1995).

von Dardel, G., "Combined Pirani and ionization gauge circuit," *J. Sci. Instrum.*, 30: 114–117 (Apr. 1953).

Leck, J. H., "Thermal Conductivity Gauges." In *Pressure Measurement in Vacuum*, Chapman and Hall: London, pp. 40–67 (1964).

(Continued)

*Primary Examiner*—Edward Lefkowitz
*Assistant Examiner*—Alandra Ellington
(74) *Attorney, Agent, or Firm*—Hamilton, Brook, Smith & Reynolds, P.C.

(57) ABSTRACT

A heat loss gauge for measuring gas pressure in an environment includes a resistive sensing element and a resistive compensating element. The resistive compensating element is in circuit with the sensing element and is exposed to a substantially matching environment. An electrical source is connected to the sensing element and the compensating element for applying current through the elements. The current through the sensing element is substantially greater than the current through the compensating element. Measuring circuitry is connected to the sensing element and the compensating element for determining gas pressure in the environment to which the sensing element and compensating element are exposed based on electrical response of the sensing element and the compensating element.

18 Claims, 8 Drawing Sheets

U.S. PATENT DOCUMENTS

| | | | |
|---|---|---|---|
| 3,429,178 A | * | 2/1969 | Durbin ...................... 73/23.21 |
| 3,580,081 A | | 5/1971 | Greenburg et al. |
| 4,106,350 A | | 8/1978 | Morris et al. |
| 4,279,147 A | | 7/1981 | Djorup |
| 4,541,286 A | | 9/1985 | Holme |
| 4,682,503 A | | 7/1987 | Higashi et al. |
| 4,736,155 A | | 4/1988 | McBrien |
| 4,787,251 A | | 11/1988 | Kolodjski |
| 4,918,974 A | * | 4/1990 | Hachey et al. ............. 73/19.07 |
| 4,995,264 A | | 2/1991 | Stocker et al. |
| 5,079,954 A | | 1/1992 | O'Neal, iii |
| 5,184,500 A | | 2/1993 | Krema et al. |
| 5,347,869 A | | 9/1994 | Shie et al. |
| 5,557,972 A | | 9/1996 | Jacobs et al. |
| 5,597,957 A | | 1/1997 | Schieferdecker et al. |
| 5,608,168 A | | 3/1997 | Schoroth |
| 5,668,320 A | | 9/1997 | Cowan |
| 5,693,888 A | | 12/1997 | Enderes et al. |
| 5,812,047 A | | 9/1998 | van Kampen |
| 6,474,172 B1 | | 11/2002 | Rolff et al. |
| 6,663,834 B1 | * | 12/2003 | Miller et al. .................. 422/94 |

OTHER PUBLICATIONS

A gauge such as illustrated in FIG. 7 of the present application, but with a different current ratio and further including a parallel trim resistor such as in FIG. 9, was sold more than one year prior to Oct. 16, 2002 but after the priority date or dates for Claims 1–14.

* cited by examiner

APPARATUS AND METHODS FOR HEAT LOSS PRESSURE MEASUREMENT

RELATED APPLICATIONS

This application is a continuation of U.S. application Ser. No. 10/273,402, filed Oct. 16, 2002, which is a continuation-in-part of U.S. application Ser. No. 09/583,339, filed May 31, 2000 now U.S. Pat. No. 6,658,941, which is a continuation-in-part of U.S. application Ser. No. 09/475,392, filed Dec. 30, 1999, now U.S. Pat. No. 6,227,056, issued May 8, 2001, which is a Divisional of U.S. application Ser. No. 08/897,629, filed Jul. 21, 1997, now U.S. Pat. No. 6,023,979, issued Feb. 15, 2000. The entire teachings of the above applications and patents are incorporated herein by reference.

BACKGROUND

Because the rate of heat transfer through a gas is a function of the gas pressure, under certain conditions measurements of heat transfer rates from a heated sensing element to the gas can, with appropriate calibration, be used to determine the gas pressure. This principle is used in the well known Pirani gauge (shown in schematic form in FIGS. 1a and 1b), in which heat loss is measured with a Wheatstone bridge network which serves both to heat the sensing element and to measure its resistance.

Referring to FIG. 1a, in a Pirani gauge the pressure sensor consists of a temperature sensitive resistance RS connected as one arm of a Wheatstone bridge. R2 is typically a temperature sensitive resistance designed to have a negligible temperature rise due to the current $i_2$. R3 and R4 are typically fixed resistences. RS and typically R2 are exposed to the vacuum environment whose pressure is to be measured. FIG. 1b illustrates an alternative bridge configuration.

Pirani gauges have been operated with constant current $i_1$ (as shown in U.S. Pat. No. 3,580,081), or with constant voltage across RS. In these methods, an electrical imbalance of the bridge is created which reflects gas pressure. Pirani gauges have also been operated with constant resistance RS (as shown in U.S. Pat. No. 2,938,387). In this mode, the rate at which energy is supplied is varied with changes in gas pressure, so the rate of change in energy supplied reflects changes in gas pressure. Each method of operation has differing advantages and disadvantages, but the following discussion pertains particularly to the constant resistance method and the configuration of FIG. 1a.

Voltage $V_B$ is automatically controlled to maintain the voltage difference between A and C in FIG. 1a at zero volts. When the potential drop from A to C is zero, the bridge is said to be balanced. At bridge balance the following conditions exist:

$$i_s = i_2, \quad (1)$$

$$i_4 = i_3 \quad (2)$$

$$i_s RS = i_4 R4, \quad (3)$$

$$\text{and } i_2 R2 = i_3 R3 \quad (4)$$

Dividing Eq. 3 by Eq. 4 and using Eq. 1 and 2 gives $$RS = \beta R2 \quad (5)$$

$$\text{where } \beta = \frac{R4}{R3} \quad (6)$$

Thus, at bridge balance RS is a constant fraction $\beta$ of R2.

To achieve a steady state condition in RS at any given pressure, Eq. 7 must be satisfied:

Electrical power input to RS=Power radiated by RS+Power lost out ends of RS+Power lost to gas by RS   (7)

A conventional Pirani gauge is calibrated against several known pressures to determine a relationship between unknown pressure, $P_x$, and the power loss to the gas or more conveniently to the bridge voltage. Then, assuming end losses and radiation losses remain constant, the unknown pressure of the gas $P_x$ may be directly determined by the power lost to the gas or related to the bridge voltage at bridge balance.

Because Pirani gauges may be designed to have wide range and are relatively simple and inexpensive, there is a long-felt need to be able to use these gauges as a substitute for much higher priced gauges such as capacitance manometers and ionization gauges. However, existing designs leave much to be desired for accurate pressure measurement, especially at lower pressures.

Prior to 1977, the upper pressure limit of Pirani gauges was approximately 20 Torr due to the fact that at higher pressures the thermal conductivity of a gas becomes substantially independent of pressure in macroscopic size devices. One of the present inventors helped develop the CONVECTRON® Gauge produced and sold by the assignee (Granville-Phillips Company of Boulder Colo.) since 1977 which utilizes convection cooling of the sensing element to provide enhanced sensitivity from 20 to 1,000 Torr. Hundreds of thousands of CONVECTRONO Gauges have been sold worldwide. Recently several imitations have appeared on the market.

Although the CONVECTRON® Gauge filled an unsatisfied need, it has several disadvantages. It has by necessity large internal dimensions to provide space for convection. Therefore, it is relatively large. Because convection is gravity dependent, pressure measurements at higher pressures depend on the orientation of the sensor axis. Also, because the pressure range where gas conduction cooling is predominant does not neatly overlap the pressure range where convection cooling occurs, the CONVECTRON® Gauge has limited sensitivity from approximately 20 to 200 Torr.

To help avoid these difficulties, microminiature Pirani sensors have been developed which utilize sensor-to-wall spacings on the order of a few microns rather than the much larger spacings, e.g., 0.5 in., previously used. See for example U.S. Pat. No. 4,682,503 to Higashi et al. and U.S. Pat. No. 5,347,869 to Shie et al. W. J. Alvesteffer et al., in an article appearing in J. Vac. Sci. Technol. A 13(6), Nov/December 1995, describe the most recent work on Pirani gauges known to the present inventors. Using such small sensor to wall spacings provides a pressure dependent thermal conductivity even at pressures above atmospheric pressure. Thus, such microscopic sensors have good sensitivity from low pressure to above atmospheric pressure and function in any orientation.

There are a number of problems with previous attempts to develop microminiature gauges. Although microminiature sensors provide good sensitivity over a large pressure range independent of orientation, their design is extremely complex and fabrication requires numerous elaborate processing steps in highly specialized equipment costing hundreds of thousands of dollars.

Microminiature sensors suffer from the same type of ambient temperature-caused errors as do macroscopic sensors. All of the heat loss terms in Eq. 7 are dependent on ambient temperature and on sensing element temperature at any given pressure. Thus, any attempt at pressure measurement with a Pirani gauge without temperature correction will be confused by non-pressure dependent power losses caused by changes in ambient temperature. All modern Pirani gauges attempt to correct for the errors caused by ambient temperature changes. A widely used means for correcting for such errors is to use for R2 a temperature sensitive compensating element RC in series with a fixed resistance R, as shown in FIGS. 1a and 1b.

British Patent GB 2105047A discloses the provision of an additional resistor to provide a potential divider. J. H. Leck, at page 58 of *Pressure Measurement in Vacuum*, Chapman and Hall: London (1964) notes that Hale in 1911 made R2 of the same material and physical dimensions as RS in his Pirani gauge. R2 was sealed off in its own vacuum environment and placed in close proximity to RS. When the pressures at R2 and RS were equal, excellent temperature compensation was achieved. However, at other pressures this means of temperature compensation is not very effective.

To avoid the extra cost and complexity of evacuating and sealing off R2 in a separate bulb, R2 is conventionally placed in the same vacuum environment as RS. By making R2 with a relatively large thermal mass and large thermal losses, self heating of R2 can be made negligible. Leck recommends that R2 be "made in two sections, for example, one of copper and the other Nichrome wire . . . so that the overall temperature coefficient (of R2) just matches that of the Pirani element itself (RS)." According to Leck, this method of temperature compensation has been used by Edwards High Vacuum of Great Britain in the METROVAC® brand gauge. A similar temperature compensation arrangement is used in the CONVECTRON® brand gauge.

However, this technique (using two or more materials in R2 having different temperature coefficients of resistance to approximate the temperature coefficient of RS) is effective only over a narrow range of pressure. In fact the compensation can be made exact only at one, or at most several temperatures as noted in U.S. Pat. No. 4,541,286, which discloses this form of temperature compensation in a Pirani gauge. Also, the inventors have found that configurations with a large thermal mass significantly increase the response time of the gauge to sudden changes in ambient temperature.

The inventors have also found, through extensive computer simulation, that using equal temperature coefficients for RS and R2 as recommended by Leck and as practiced in the prior art does not provide an entirely accurate temperature compensation. The inventors have also found that at pressures less than approximately $5 \times 10^{-3}$ Torr, the end losses exceed all other losses combined. The relative loss components as determined by this research (radiation loss, end loss and gas loss components of total loss) are shown in the graph of FIG. 2. At $1 \times 10^{-5}$ Torr, the end losses are over 1000 times greater than the gas loss and radiation losses are approximately 100 times greater than the gas loss.

Therefore, temperature change effects in prior art Pirani Gauges are especially troublesome at very low pressures where gas conduction losses are very low. Prior art heat loss gauges cannot measure very low pressures accurately, for example, $1 \times 10^{-5}$ Torr. The inventors have discovered that this limitation is a result of failure to maintain end losses in the sensing element sufficiently constant when ambient temperature changes. The Alvesteffer-type Pirani gauge has the capability of indicating pressure in the $10^{-5}$ Torr range, but does not provide an accurate indication within that range. For example, if the end losses are not held constant to one part in 5,000 in a typical Pirani gauge, a pressure indication at $1 \times 10^{-5}$ Torr may be off by 50% to 100%.

The following analysis shows why prior art designs are ill-suited to correct adequately for ambient temperature changes at low pressures. For convenience in examining the prior art, the problems are explained using examples of gauges with relatively large spacing of sensor element to wall. It should be understood that the same type of problems exist in the much more complex geometries of microminiature gauges, with sensing element-to-wall spacings on the order of a few microns.

FIG. 3 is a schematic representation of a portion 302 of a conventional Pirani gauge using a small diameter wire sensing element 304 and a compensating element 303. Those familiar with Pirani gauge design will appreciate that the components in FIG. 3 are not shown to scale, for ease of explanation and understanding. Typically, small diameter wire sensing element 304 is electrically and thermally joined to much larger electrical connectors 306, 307 which are thermally joined to much larger support structures 308, 309. Let $T_{AL}$ represent the temperature in support structure 308 at the left end of sensing element 304 and $T_{AR}$ represent the temperature in support structure 309 at the right end at any given time t. Let $T_{SL}$ and $T_{SR}$ represent the temperatures at left sensing element connector 306 and right sensing element connector 307 respectively. Let $T_{CL}$ and $T_{CR}$ represent the temperatures at left compensating element connector 310 and right compensating element connector 311 respectively. Let $T_{XL}$ and $T_{XR}$ represent the temperatures a distance $\Delta X$ from connectors 306 and 307 respectively. In prior art designs, it has apparently been assumed that all of these temperatures are the same. However, the inventors have found that even seemingly negligible differences assume great importance for low pressure accuracy.

To better understand temperature compensation requirements, it is important to note several facts.

(1) At low pressures, the temperature of RC is determined predominantly by heat exchange between the compensating element connections and the compensating element. This is because at ambient temperature and low pressures, radiation and gas conduction are very inefficient means of exchanging heat from the compensating element to its surroundings relative to heat conduction through the ends of the compensating element. Thus, at low pressures the compensating element temperature will be very close to the average of the temperatures of the connectors at each end of the compensating element as shown in Eq. 8.

$$T_{AVG} = \frac{T_{CL} + T_{CR}}{2} \qquad (8)$$

(2) The temperature of the electrically heated sensing element varies from the ends to center, increasing with distance from the cooler supports. Using finite element analysis the inventors have simulated the temperature distribution along the sensing element. It has been found that with equal temperature coefficients of resistance for RS and RC, the temperature Tn of any segment n of the sensing element changes with changes in average temperature $T_{AVG}$ of the compensating element RC at constant pressure at bridge balance so as to maintain a constant difference $\Delta Tn = Tn - T_{AVG}$. The difference $\Delta Tn$ is a function of $\beta$ and R where $R = R2 - RC$.

(3) According to Eq. 5, the sensing element resistance RS at bridge balance will be maintained at a resistance $\beta$ times the resistance element R2. As the ambient temperature increases, the compensating element connectors also increase in temperature and thus the temperature and resistance of RC will increase according to Eq. 8. Any increase in the temperature and therefore the resistance of RC causes an increase in the temperature and resistance of all segments of RS at bridge balance.

(4) The power losses out the ends of the sensing element depend on the temperature gradient γ at the ends of the sensing element according to Eq. 9:

$$\text{Power lost out end} = k\gamma \qquad (9)$$

where k is a constant and $$\gamma_L = \frac{T_{XL} - T_{SL}}{\Delta X} \quad \text{at left end} \qquad (10)$$

$$\gamma_R = \frac{T_{XR} - T_{SR}}{\Delta X} \quad \text{at right end.} \qquad (11)$$

If $\gamma_L$ and or $\gamma_R$ vary for any reason, then the end losses will change and the pressure indication will be erroneous.

To understand in detail a significant deficiency in the prior art of temperature compensation at low pressures, assume that from a steady state, $T_{AR}$ is increased slightly for example by changes in the local ambient temperature environment of the right support structure. Assume $T_{AL}$ remains unchanged. Because $T_{AL}$ is assumed not to change, $T_{CL}$ and $T_{SL}$ will remain unchanged. However, the increase in $T_{AR}$ will cause $T_{CR}$ to increase by conduction of heat through the connection.

$$\text{Thus, } T_{AVG} = \frac{T_{CL} + T_{CR}}{2}$$

will increase. An increase in $T_{AVG}$ will cause an increase in $T_{XL}$ and $T_{XR}$ at bridge balance, which will produce changes in $\gamma_L$ and $\gamma_R$. These changes in $\gamma_L$ and $\gamma_R$ will change the end loss term in Eq. 7, causing an error in pressure measurement dependent on the size of the changes in $\gamma_L$ and $\gamma_R$.

The inventors have determined that unless $T_{AL}$ changes in substantially the same way as $T_{AR}$, sensing element end losses will not remain unchanged whenever ambient temperature changes. Prior art Pirani gauges have not been specifically designed to maintain $T_{AL} = T_{AR}$ to the degree necessary for accurate low pressure measurement.

To understand another important deficiency in prior art temperature compensation, assume that from a steady state, ambient temperature is increased and that ambient temperature conditions are such that $T_{AL} = T_{AR}$. Further assume the sensing element connectors are of equal length but that the right compensating element connector is substantially longer than the left compensating element connector as is the case in a popular prior art Pirani gauge. Thus, $T_{SL} = T_{SR}$ but $T_{CR}$ will lag behind $T_{CL}$ because of the assumed differences in length. During this lag time when $T_{CL} \neq T_{CR}$, $T_{AVG}$ will change, thus changing $T_{XL}$ and $T_{XR}$ at bridge balance. Thus, $\gamma_L$ and $\gamma_R$ will continually change during the lag time, producing errors in low pressure indication.

The inventors have determined that unless the sensing element and compensating element connectors have substantially identical physical dimensions and substantially identical thermal properties, sensing element end losses will not remain unchanged when ambient temperature changes. Prior art Pirani gauges have not been specifically designed so that sensing and compensating element connectors have identical physical dimensions and thermal properties.

Another significant deficiency arises (as the inventors have discovered) from differences in mass between the compensating element and the sensing element. Assume that the mass of the compensating element is substantially larger than that of the sensing element as is typically the case. With prior art Pirani gauges it is common practice to make the compensating element large relative to the sensing element and to provide a relatively large heat loss path to the compensating element surroundings so that the heat arising from dissipation of electrical power in RC can be readily dispersed. From a steady state, assume that ambient temperature increases and that $T_{AL} = T_{AR}$ at all times. Thus, it will take a longer time for the compensating element to reach a new steady state temperature relative to the time it will take $T_{SL}$ and $T_{SR}$ to reach a new steady state temperature. During this time (which has been observed to be of several hours duration in a popular prior art Pirani gauge) $T_{AVG}$ will continually change, thus continually changing $T_{XL}$ and $T_{XR}$ at bridge balance. Thus, $\gamma_L$ and $\gamma_R$ will change during the lag time, sensing element end losses will not remain constant, and errors will be produced in low pressure measurement.

The same type of problems occur if the compensating element is designed to change temperature at a different rate than does the sensing element with change in ambient temperature at bridge balance. Prior art designs such as the Alvesteffer-type device have this deficiency.

From their research, the inventors have determined that, unless the compensating element has been designed to change temperature at the same rate as the sensing element, sensing element end losses continue to change long after ambient temperature has stabilized at a new value. Yet, prior art Pirani gauges have not been designed to meet this requirement.

It has long been known to use for R2 a compensating element RC, with substantially the same temperature coefficient of resistance as the sensing element, in series with a temperature insensitive resistance element R so as to provide temperature compensation for gas losses and end losses which vary as the temperature difference between the sensing element and its surroundings. This method of temperature compensation has been employed in the CONVECTRON® Gauge for many years and is also used in the Alvesteffer gauge.

This method of temperature compensation assumes that if (1) the temperature coefficients of resistance of the sensing and compensating elements are equal; and (2) the change in sensing element resistance can be made to rise in tandem with change in compensating element resistance, then (3) the temperature of the sensing element will rise in tandem with ambient temperature changes. Satisfying these two assumptions is highly desirable, of course, because doing so would assure that the temperature difference between the heated sensing element and the surrounding wall at ambient temperature would remain constant as ambient temperature changes.

However, the inventors have found that prior art gauges which utilize a constant resistance R in series with a temperature sensitive resistance RC for R2 provide only partial temperature compensation as will now be explained.

Assume that in FIG. 1a, R2 is composed of a temperature sensitive compensating element RC and a temperature insensitive resistance R so that $$R2 = RC + R \qquad (12)$$

Thus, Eq. 5 derived above for bridge balance may be written as $$RS = \beta(RC + R) \qquad (13)$$

where β is defined by Eq. 6 above.

Further, assume when the ambient temperature environment of the gauge is equal to $T_1$ that the sensing element operates at temperature $T_{S1}$ and the compensating element operates at temperature $T_{C1}$. Thus when $$T_{AMBIENT} = T_1 \quad (14)$$

Eq. 13 may be written as:

$$RS(T_1)(1+\alpha_S(T_{S1}-T_1)) = \beta[RC(T_1)(1+\alpha_C(T_{C1}-T_1))+R] \quad (15)$$

Here, $RS(T_1)$ is the resistance of the sensing element at temperature $T_1$, $\alpha_S$ is the temperature coefficient of resistance of RS at $T_1$, $RC(T_1)$ is the resistance of the compensating element at temperature $T_1$, and $\alpha_C$ is the temperature coefficient of resistance of $R_C$ at $T_1$. Thus, when:

$$T_{AMBIENT} = T_2$$

Eq. 13 may be written as:

$$RS(T_1)(1+\alpha_S(T_{S2}-T_1)) = \beta[RC(T_1)(1+\alpha_C(T_{C2}-T_1))+R] \quad (16)$$

Solving Eq. 15 for $T_{S1}$ gives $$T_{S1} = \left[\frac{\beta}{RS(T_1)}[RC(T_1)(1+\alpha_C(T_{C1}-T_1))+R]-1\right]/\alpha_S + T_1. \quad (17)$$

Solving Eq. 16 for $T_{S2}$ gives $$T_{S2} = \left[\frac{\beta}{RS(T_1)}[RC(T_1)(1+\alpha_C(T_{C2}-T_1))+R]-1\right]/\alpha_S + T_1 \quad (18)$$

Subtracting Eq. 17 from Eq. 18 gives the temperature change $\Delta T$ in the sensing element RS when ambient temperature changes from $T_1$ to $T_2$. Thus, $$\Delta T = T_{S2} - T_{S1} = \beta\left(\frac{RC(T_1)}{RS(T_1)}\right)\left(\frac{\alpha_C}{\alpha_S}\right)(T_{C2}-T_{C1}) \quad (19)$$

Note that an effective compensating element is designed so that its temperature closely follows ambient temperature. Thus, to a very good approximation, $$T_{C2}-T_2 = T_{C1}-T_1$$

or $$T_{C2}-T_{C1} = T_2-T_1 \quad (20)$$

Thus, Eq. 19 may be written as:

$$\Delta T = \beta\left(\frac{RC(T_1)}{RS(T_1)}\right)\left(\frac{\alpha_C}{\alpha_S}\right)(T_2-T_1) \quad (21)$$

It is evident from Eq. 21 that the temperature change $\Delta T$ in the sensing element RS will be equal to the change in ambient temperature $T_2-T_1$ only if $$\beta\left[\frac{RC(T_1)}{RS(T_1)}\right]\left[\frac{\alpha_C}{\alpha_S}\right] = 1 \quad (22)$$

Prior art gauges using a temperature sensitive compensating element RC in series with a fixed resistance R for R2 in FIG. 1a provide only partial temperature compensation depending on the choice of $\beta$. Commercially available gauges having the design described by Alvesteffer et al., the most recent work on Pirani gauges known to the present inventors, would not satisfy Eq. 22.

As a third problem with prior art gauge designs, the inventors have found that the level of power dissipation in R2 adversely affects accuracy. Prior art Pirani gauges, when configured as in FIG. 1a, have the same pressure dependent current in RS as is in the compensating element at bridge balance. When configured as in FIG. 1b, at balance the same pressure dependent voltage is applied across R2 as across RS. Of course, a pressure dependent current in R2 will cause the temperature of RC to rise above ambient temperature by an amount which varies with pressure.

Prior art Pirani gauges typically use a compensating element of much larger physical dimensions than the sensing element, to dissipate the heat and thus prevent excessive temperature in the compensating element. As noted above, different physical dimensions for the sensing and compensating elements cause measurement errors when ambient temperature changes.

A fourth problem is that prior art Pirani gauges produce shifts in pressure indications at low pressures when ambient temperature changes. Prior art Pirani gauges have used a variety of components in attempting to maintain the power lost by the sensing element unchanged as ambient temperature changes. For example, in U.S. Pat. No. 4,682,503 thermoelectric cooling is used to control ambient temperature and thus minimize ambient temperature changes.

In the device disclosed in U.S. Pat. No. 4,541,286, a thermally sensitive element is mounted adjacent to the compensating arm of the bridge (actually glued to the exterior of the vacuum enclosure in a commercial version). Alvesteffer et al. use an additional element (designated therein as R4) in the bridge to help compensate for the fact that the temperature coefficient of resistance is slightly different for the sensing element at operating temperature, compared to the compensating element at ambient temperature. Although each of these prior art hardware fixes remove some of the errors caused by changes in ambient temperature, none of them removes substantially all of the errors. Thus prior art Pirani gauges produce significant shifts in pressure indications at low pressures when ambient temperature changes.

Another prior system, disclosed in U.S. Pat. No. 5,608,168, links various electrical measurements of the bridge (or approximations thereof) and determines the value or temperature of the temperature dependent resistance, and takes this parameter into account in determining the pressure measurement. However, this system has increased complexity because of the need to measure temperatures or other values.

Thus, there is a need for an improved Pirani-type gauge which overcomes these problems.

SUMMARY OF THE INVENTION

The present invention provides improvements for heat loss pressure measurement which cooperate synergistically to provide significantly improved low, mid-range and high pressure measurement accuracy, thus, permitting the range of accurate pressure measurement to be extended to lower and to higher pressures within a single gauge.

As a first improvement, a small diameter wire sensing element is positioned in the same plane as and spaced from a small diameter wire compensating element with two parallel flat thermally conductive plates, each spaced 15 microns from the sensing and compensating elements. In this manner, the inventors have achieved high relative sensitivity in simple geometry without relying on convection. The extreme complexity and cost of microminiature Pirani gauge designs and the several disadvantages of convection cooling of the sensing element are simultaneously avoided.

The inventors have found that this extremely simple, small, and inexpensive measuring means gives results up to atmospheric pressure comparable to those obtained with very complex microminiature Pirani gauges and to those obtained with much larger, position-sensitive convection-cooled Pirani gauges. Surprisingly, this improvement also provides a sensing element with a volume of only 3% that of the sensing element in the microminiature Alvesteffer gauge. The compensating element in the new device has a volume of less than 0.5% of the Alvesteffer-type compensating element.

The present invention also provides improved temperature correction. The inventors have found that the accuracy of low pressure measurement can be significantly improved by better maintaining constant the temperature gradient γ at the ends of the sensing element (see Eqs. 10 and 11). The inventors have found that constancy of γ can be achieved by simultaneously:

1. Using sensing and compensating elements with substantially identical physical dimensions, thermal properties and resistance properties;
2. Using sensing element and compensating element connections with substantially identical physical dimensions, thermal properties and resistance properties;
3. Using element connections with substantially identical and large thermal conductances to a region of substantially uniform temperature for all connections; and
4. Locating the sensing and compensating elements in the same vacuum environment.

In the present invention, Eq. 22 is satisfied at all times because the gauge is designed so that:

$$RC(T_A) = RS(T_A) \tag{23}$$

where $T_A$ is ambient temperature, and where $$\alpha_C = \alpha_S \tag{24}$$

$$\beta = 1 \tag{25}$$

Another significant improvement is realized by providing negligible heating in the compensating element. The inventors have modified the conventional Wheatstone bridge to provide independent heating means for the sensing element, while producing substantially zero heating in any of the other three arms of the bridge. Thus, the compensating element can be made with identical dimensions of the sensing element as well as identical physical properties. A DC heating current is used and confined to only the sensing element. A relatively small AC signal is used to sense bridge balance.

An additional performance improvement is realized by providing a new method of pressure compensation that results in accurate pressure indication at all pressures. In particular, the inventors have discovered that an accurate indication of an unknown pressure $P_X$ at bridge balance may be calculated from a simple equation of the form of Eq. 26:

$$P = f(VS, IS) \tag{26}$$

Where VS is the voltage drop across the sensing element and IS is the current in the sensing element. The particulars of Eq. 26 are derived from paired values of $VS_C$ and $IS_C$ obtained by calibration methods for multiple known values of pressure $P_C$ and ambient temperature spread across the pressure and temperature ranges of interest, using three-dimensional curve fitting software. $VS_X$ and $IS_X$ are measured at the unknown pressure $P_X$ at bridge balance and substituted into Eq. 26. Then, $P_X$ is calculated using a microprocessor or the like.

In this manner, the present invention provides significant advancements in Pirani gauge accuracy, production cost, and package size.

The present invention further includes a heat loss gauge for measuring gas pressure in an environment. The gauge includes a resistive sensing element and a resistive compensating element in circuit with the sensing element and being exposed to a substantially matching environment. An electrical source is connected to the sensing element and compensating element for applying current through the elements. The current through the sensing element is substantially greater than the current through the compensating element. Measuring circuitry is connected to the sensing element and the compensating element for determining gas pressure in the environment to which the sensing element and compensating element are exposed based on electrical response of the sensing element and the compensating element.

In some embodiments, separate currents flow through the sensing element and the compensating element. Current is applied to heat the sensing element to a temperature at which the resistance of the sensing element matches the combined resistance of the compensating element plus the value of a constant number of ohms. In embodiments where the compensating element is positioned in series with a non-temperature-sensitive resistive element, current is applied to heat the sensing element to a temperature at which the resistance of the sensing element matches the combined resistance of the compensating element and the non-temperature-sensitive resistive element. Gas pressure is determined based on heating current through the sensing element and resulting voltage across the sensing element. In one embodiment, separate DC currents flow through the sensing element and the compensating element. The current through the compensating element is a predetermined fraction of the current through the sensing element so that the currents have a defined ratio. Feedback circuitry controls the levels of current through the sensing element and the compensating element. In another embodiment, a sensing current flows through both the sensing element and the compensating element, and a separate heating current flows through the sensing element.

In further embodiments, the sensing and compensating elements are of different lengths. In some embodiments, the compensating element is about 5%–8% shorter in length, for 5%–8% lower resistance than the sensing element. In a specific embodiment, the compensating element is 6%–7% shorter, about 6%–7% lower resistance, than the sensing element. In other embodiments, a parallel resistor is positioned across one of the sensing and compensating elements to trim the relative resistances.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4b is a cross-sectional view of the portion shown in FIG. 4a;

DETAILED DESCRIPTION OF THE INVENTION

A description of preferred embodiments of the invention follows. The invention is first described in terms of four categories of improvements to conventional Pirani gauge designs. In a particularly preferred embodiment, the four improvements are used together, and combine synergistically to provide a Pirani gauge having substantially improved performance characteristics. Additional embodiments of the present invention are then described thereafter.

Improvement 1

Figure 1A:
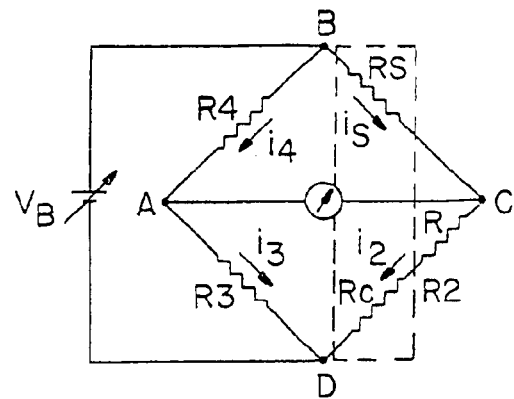
FIGS. 1a and 1b are simplified schematic diagrams of conventional Pirani gauges.
Figure 1B:
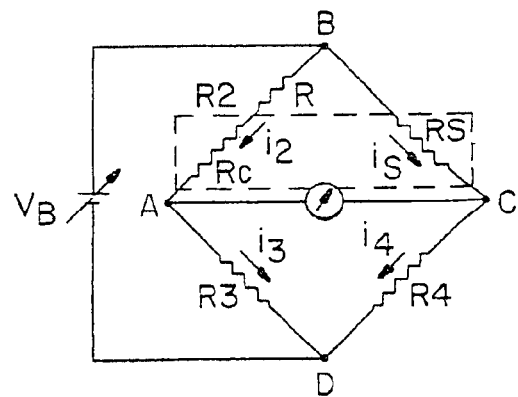
Figure 2:
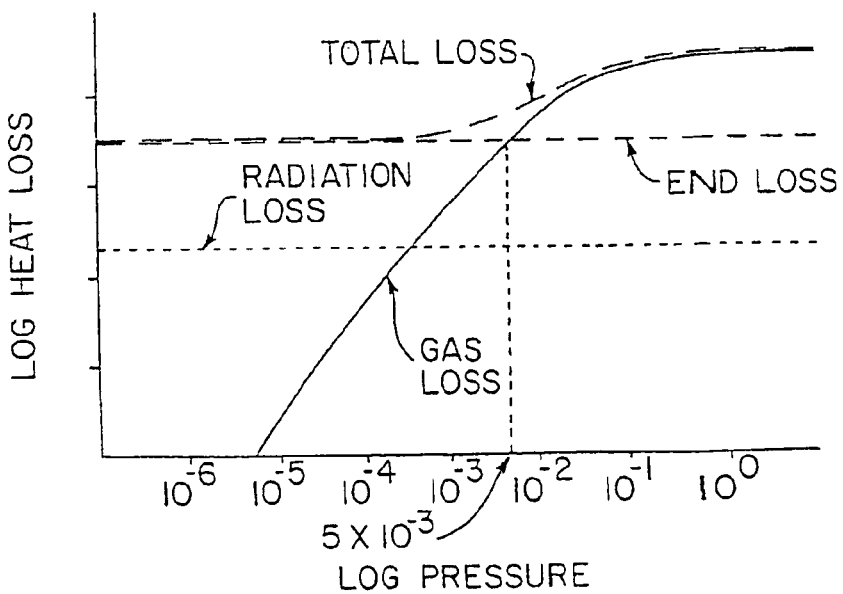
FIG. 2 is a graph showing the components of heat loss in a conventional Pirani gauge, as discovered through the inventors' research.
Figure 3:
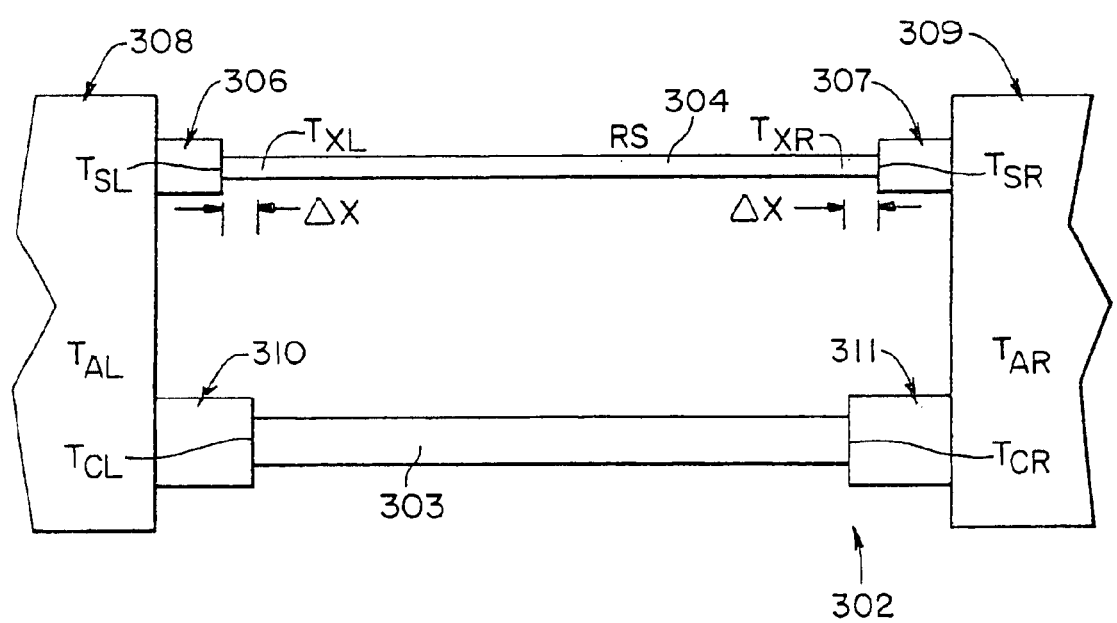
FIG. 3 is a schematic representation of a conventional Pirani Gauge using a small diameter wire for the sensing element.
Figure 4A:
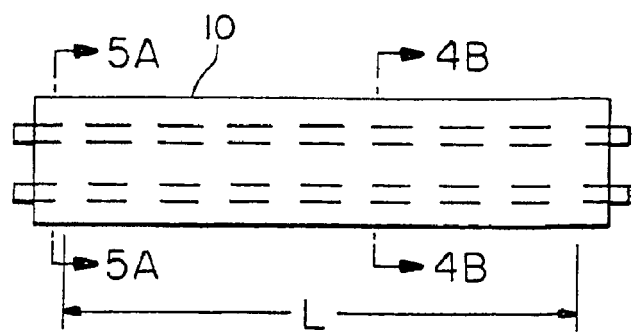
FIG. 4a is a portion of an improved heat loss gauge according to the present invention.
Figure 4B:
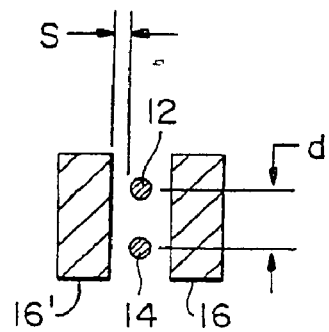

The first category of improvements will be discussed with reference to FIGS. 4a and 4b. FIG. 4a is a side view of a portion 10 of an improved heat loss gauge (not to scale). FIG. 4b is a sectional view of portion 10 taken along line 4b—4b in FIG. 4a. As shown in FIGS. 4a and 4b, a small diameter wire sensing element 12 is located in the same plane and spaced a distance d from a small diameter wire compensating element 14. Spacing d between sensing element 12 and compensating element 14 is preferably approximately 0.030 in. but may range from 0.010 in. to 0.200 in. Parallel plates 16 and 16' are provided proximate to and parallel to sensing element 12 and compensating element 14.

Parallel plates 16 and 16' are positioned a distance S from sensing element 12 and compensating element 14. S is preferably 0.0007 in. but may range from 0.0002 in. to 0.002 in. Sensing element 12 is made of a material with a high temperature coefficient of resistance, such as pure tungsten, which may be gold plated to help assure a constant emissivity.

The diameter of sensing element 12 is preferably 0.0005 in. but may range from 0.0001 in. to 0.002 in. Although a cylindrical wire shape is preferred, other shapes such as a ribbon may be used for both the sensing and compensating elements. The length of sensing element 12 is preferably 1 in. but may range from 0.25 in. to 3 in.

Compensating element 14 is made of the same material as the sensing element 12 with the same physical dimensions, and with the same thermal and resistance properties.

Portion 10 of the heat loss gauge may be installed in a measuring circuit of the type shown in FIG. 6, in a manner which will be described in more detail below.

Parallel plates 16 and 16' conduct heat and thereby tend to equalize-temperature gradients along heated sensing element 12 and between the ends of sensing element 12 and compensating element 14. In this manner, the invention achieves high relative sensitivity with a simple structure, and without relying on convection. In this embodiment of the invention, the accuracy of low pressure measurement is significantly improved by using sensing and compensating elements with substantially identical physical dimensions, thermal properties and resistance properties, and locating the sensing and compensating elements in the same vacuum environment. Using this design, the extreme complexity and cost of microminiature Pirani gauge designs and disadvantages associated with convection cooling of the sensing element are simultaneously avoided. This improvement permits pressure measurement results up to atmospheric pressure comparable to those obtained with very complex microminiature Pirani gauges, and comparable to those obtained with much larger, position sensitive convection cooled Pirani gauges.

Improvement 2

As a second broad feature of the invention, an improved mounting arrangement is provided for the sensing and compensating elements. The accuracy of low pressure measurement is significantly improved by using sensing element and compensating element connections with substantially identical physical dimensions, thermal properties and resistance properties, and by using element connections with substantially identical and large thermal conductances to a region of substantially uniform temperature for all connections.

Figure 5A:
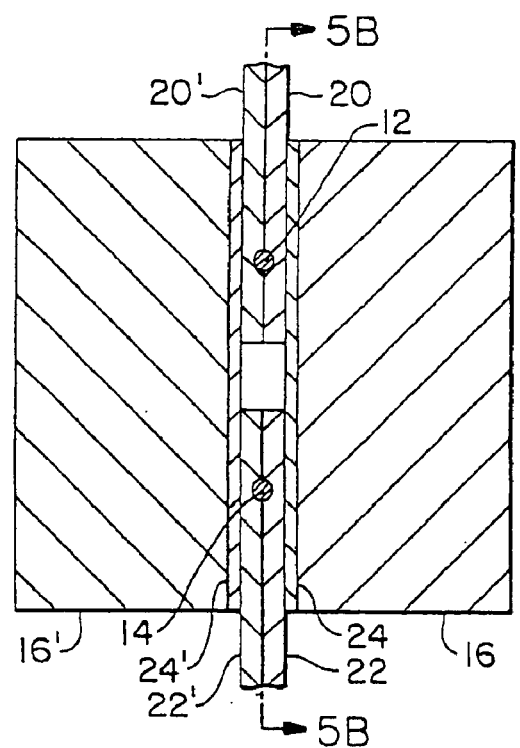
FIG. 5a is an enlarged cross-sectional view of the ends of an improved heat loss gauge according to the present invention, showing support and connection of sensing and compensating elements.

FIG. 5a is a greatly enlarged cross-sectional view of one end of gauge portion 10 where the sensing element 12 is supported by and electrically connected to sensing element connectors 20 and 20' and the compensating element 14 is shown supported by and electrically connected to compensating element connectors 22 and 22'. The section of FIG. 5a is taken along line 5a—5a in FIG. 4a. Preferably, identical supports (as shown in FIG. 5a) are provided at each end of gauge portion 10.

Connectors 20, 20', 22 and 22' are preferably made of platinum ribbon, 0.001 in. thick by 0.060 in. wide. Plates 16 and 16' are preferably made of an electrically insulating material with a high thermal conductivity such as aluminum nitride.

Alternatively, sensing and compensating element connectors 20, 20', 22 and 22' can be electrically insulated from the plates 16 by thin electrically insulating layers 24 and 24' which may be a diamond-like coating on tungsten. In this case, Plates 16 and 16' may be made of a high thermal conductivity material such as tungsten. Preferably, the selected material has a thermal conductivity greater than 0.25 watts/cm/K.

Plates 16 and 16' are held in position by simple sheet metal clamps at each end (not shown). The clamps apply sufficient force to the plates 16 and 16' to embed the sensing element 12 and the compensating element 14 into the connectors 20, 20', 22 and 22' until the connectors 20 and 20', and 22 and 22' are in intimate contact. Thus, the spacing S between the sensing element 12 and the surface of the plates 16 and 16' is determined by the diameter of the sensing element and the thickness of the thin ribbon connectors 20, 20', 22, and 22'. This feature of the present invention permits a sensing element smaller than a human hair to be spaced a comparable distance from two flat surfaces, precisely and very inexpensively as well as providing electrical connections to additional circuitry.

Plates 16 and 16' provide a region of substantially uniform temperature, especially when isolated in vacuum with minimal thermal conductivity to the outside world. The thin ribbon connectors 20, 20', 22 and 22' provide identical dimensions, short path and very large thermal conductances to said region of uniform temperature, thus satisfying several of the conditions for constancy of temperature gradient, $\gamma$, at the ends of the sensing element.

Figure 5B:
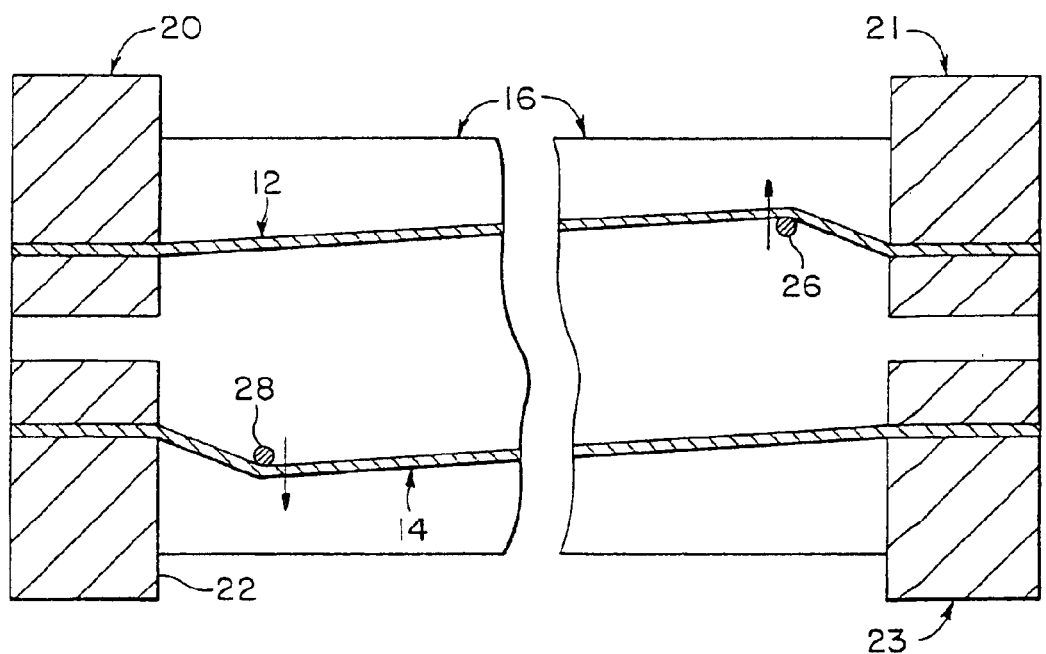
FIG. 5b is a cross-sectional view showing one embodiment of a mechanism according to the present invention for maintaining spacing between heat conducting plates and a sensing element and compensating element, respectively.

Sensing element 12 may be suitably tensioned as shown in FIG. 5b by a small diameter wire spring 26 which is loaded during assembly and bears on sensing element 12 adjacent to said connector 21 of sensing element 12. Spring 28 is used in a similar manner to tension the compensating element 14. Springs 26 and 28 serve to maintain precise spacing of the sensing element 12 and compensating element 14 relative to plates 16 and 16' as ambient temperature changes. Sufficient slack must be built into the sensing element 12 and compensating element 14 assemblies to prevent breakage due to differential thermal expansion of the elements 12 and 14 and the plates 16. Without the springs 26 and 28, this slack would change with ambient temperature, thus preventing maintenance of constant spacing S between the parallel plates 16 and 16' and the sensing and compensating elements, respectively, and causing measurement errors.

In the design according to this embodiment of the invention, Eq. 22 is partially satisfied by the fact that sensing element 12 and compensating element 14 are physically, electrically, and thermally identical. In addition, R3 is set equal to R4 in the embodiment of FIG. 6, which from Eq. 6 assures that $\beta=1$. Thus, Eq. 22 is fully satisfied at all times by this design.

Improvement 3

A third major feature of the invention is an apparatus and method for independently heating sensing element 12. This improvement is illustrated in FIG. 6 wherein a Wheatstone bridge 30 is modified to provide independent heating of sensing element 12. Prior art circuits, used with a compensating element with the same physical dimensions and made of the same material as the sensing element as in the present invention, cause the compensating element to operate not at ambient temperature but at the same temperature as the sensing element. Thus, Pirani gauges with the inventive improvements described above cannot achieve their accuracy potential using prior art heating circuits.

Figure 6:
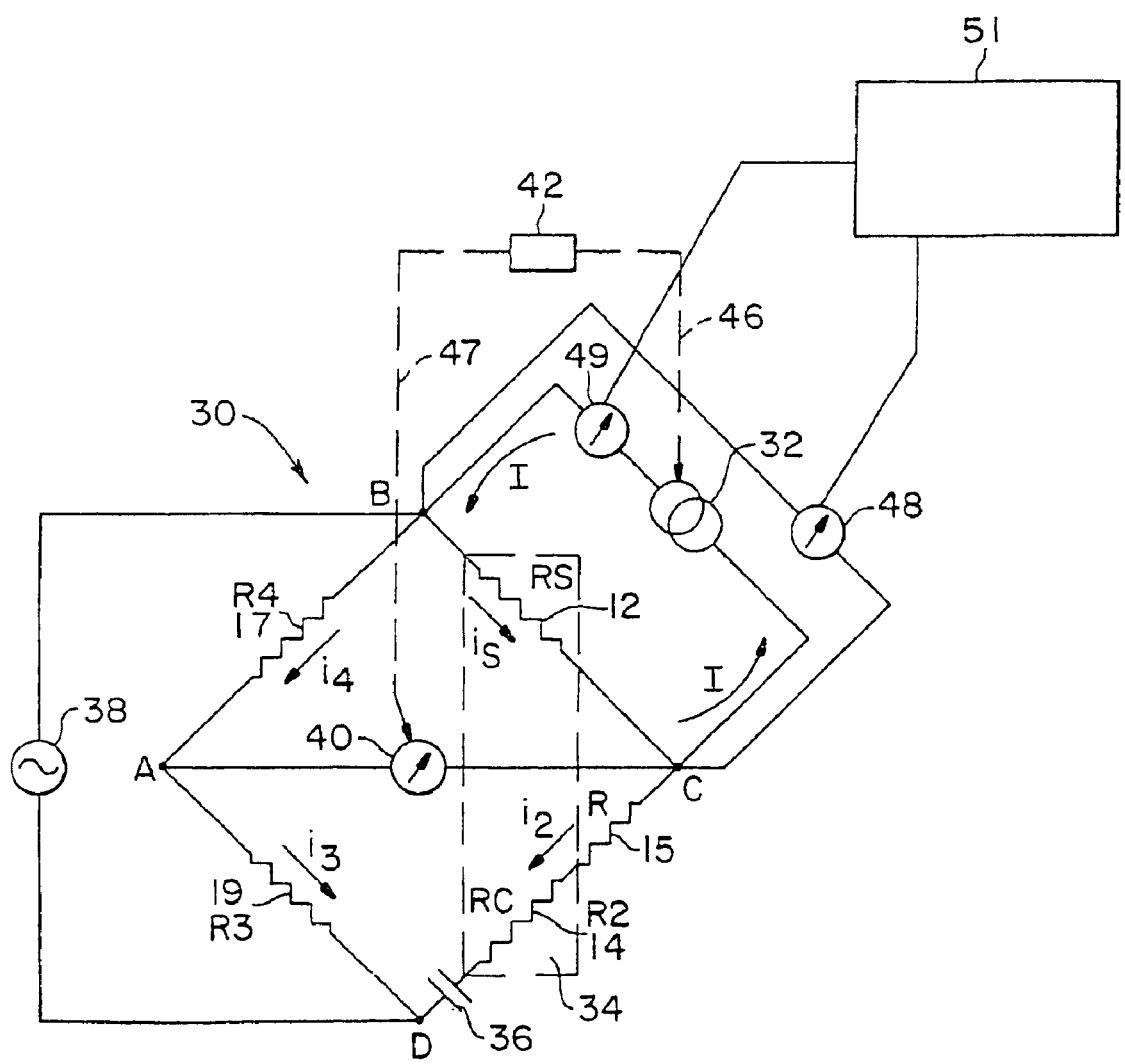
FIG. 6 is a schematic diagram showing an independent heating arrangement for a sensing element according to the present invention.

Referring now to FIG. 6, a Wheatstone bridge 30 with nodes A, B, C, and D is provided with sensing element 12 having resistance value RS, connected between nodes B and C. Non-temperature sensitive resistance element 15 (having resistance R) and compensating element 14 (having resistance RC) together make up resistance R2. R2 and capacitor 36 are connected in series order between nodes C and D. Resistor 17 having value R4 is connected between nodes A and B, and resistor 19 having value R3 is connected between nodes A and D. Vacuum environment 34 encloses sensing element 12 and compensating element 14. AC voltage source 38 is connected between nodes B and D, and frequency selective detector 40 is connected between nodes A and C. DC current source 32 is connected between nodes B and C to provide current to node B. Controller 42 is connected, via automatic feedback linkages 46 and 47, so as to control DC current source 32 and so as to receive a voltage detection input from frequency selective detector 40 for purposes of that control.

Vacuum environment 34 encloses a portion 10 (as shown in FIGS. 4a and 4b and described above with reference to those Figures) comprising sensing element 12, compensating element 14, and plates 16 and 16'. In addition, the assembly method described previously with reference to FIGS. 5a and 5b is preferably used in the circuit of FIG. 6. Element connectors 20 and 20' at one end of sensing element 12 (shown in FIG. 5a) are electrically connected to Point C in bridge circuit 30 of FIG. 6, while sensing element connectors 21 and 21' (not shown) at the other end of sensing element 12 are electrically connected to Point B in FIG. 6. Compensating element connectors 22 and 22' at one end of compensating element 14 (shown in FIG. 5a) are electrically connected through capacitor 36 to Point D in FIG. 6, while the other end of compensating element 14 is connected to compensating element connectors 23 which are connected through a resistance 15 to Point C.

As shown in FIG. 6, DC current source 32 furnishes heating current I to sensing element 12 which is located in the vacuum environment 34. A capacitor 36 is provided as a means for preventing current from current source 32 from being present in R2, R3 and R4. Thus, unlike prior art Pirani gauges using a conventional Wheatstone bridge, no portion of the heating current or heating voltage in RS is present in R2 at any time.

AC voltage source 38 applies an AC signal voltage to bridge 30 producing AC signal currents $i_S$, $i_2$, $i_3$, and $i_4$. Using very small values for $i_S$, $i_2$, $i_3$ and $i_4$ and frequency selective detector 40, bridge balance can be detected with negligible heating produced in any arm of bridge 30. The DC current I from source 32 is automatically adjusted by controller 42, so as to continually assure that the AC voltage drop $i_S RS$ from point B to C is equal to the voltage drop $i_4 R4$ from B to A as measured by the AC voltage detecting function of frequency selective detector 40. This automatic feedback linkage is indicated by dashed lines 46 and 47.

Processor 51 is connected to current meter 49 and to voltage meter 48, and produces an output indicative of pressure in the vacuum environment 34 based on the level of heating current and through sensing element 12 and the voltage drop across sensing element 12.

Thus, compensating element 14 may be made with the same physical dimensions and thermal and resistance properties as sensing element 12 and still operate at ambient temperature without any pressure dependent electrical heating.

Improvement 4

A fourth improvement will be described with reference again to FIG. 6. In this improvement, an improved apparatus and method are provided for calibrating and operating the Pirani gauge according to the present invention.

The inventors have discovered that an accurate indication of an unknown pressure $P_X$ at bridge balance may be calculated from a simple equation of the form of Eq. 26.

$$P = f(VS, IS) \qquad (26)$$

This finding differs from more conventional approaches. Pressure indication has been considered to depend not only on resistance of the sensing element, but also on other factors such as ambient temperature. Thus, conventional calibration schemes often require measurements of resistance and other quantities, both for calibration and during operation. However, the inventors have discovered that when the improvements described above are made, the values of VS and IS incorporate sufficient temperature information to produce an accurate pressure output, so that it is possible to eliminate the steps of separately measuring other parameters such as ambient temperature. In this manner, it is possible to use a three dimensional calibration table to determine pressure based on voltage and current alone.

In order to calibrate the gauge shown in FIG. 6, sensing element 12 is exposed to a series of known representative pressures and ambient temperatures spread over the pressure and temperature ranges of interest. The voltage drop, $VS_C$, as measured by voltmeter 48 and the current, $IS_C$, as measured by current meter 49 are recorded together at bridge balance with each of the known representative calibration pressures, $P_C$. These values may be recorded by a program operating in processor 51 or may be transferred to another processing unit for calibration calculations. The pressure $P_C$ is plotted against voltage $VS_C$ and current $IS_C$. Each series of measurements at a given calibration temperature produces a constant temperature function relating pressure to voltage and current. Significantly, as noted above, the inventors have discovered that these constant temperature functions can be usefully combined in a single three-dimensional data table to define a single calibration function of the form of Eq. 26. When this is done, the result is a series of points defining a surface, where the height of the surface is the pressure and is a function of measured voltage and current values.

The resulting calibration data may be stored in a lookup table and measured pressures can be determined by interpolating between pressure values stored in the lookup table based on the measured voltage drop and current. However, because of the number of points that must be stored to produce accurate output over a wide range of pressures, in the preferred embodiment, an approximating equation is obtained for the surface on which the measured values lie. This can readily be accomplished using three-dimensional surface plotting software. The resulting equation is of the form shown in Eq. 26. Then, to measure an unknown pressure $P_X$ at any temperature, $VS_X$ is measured by voltmeter 48 and $IS_X$ is measured by current meter 49 at bridge balance. The correct value of pressure can then be readily obtained by substitution in Eq. 26 giving:

$$P_X = f(VS_X, IS_X) \quad (27)$$

For convenience, Eq. 27 can be stored in processor 51 which can then be used to automatically calculate $P_X$ when $VS_X$ and $IS_X$ are input to processor 51.

Those skilled in the art will appreciate that other quantities could be substituted for voltage and current within the scope of this invention. For example, a function of the form $P_X = g(W, R)$ where W is power applied to sensing element 12 and R is the resistance of sensing element 12 could be used in place of Equation 27. In this case, W and R can be calculated from the output of voltmeter 48 and current meter 49. What is important is that the two selected parameters include information relating to both current and voltage, such that the effects of changes in current and voltage will be differentially reflected in the calibration graph or table created based on values of the two parameters. Thus, for example, the two input parameters for the function may be any two of a group including: power, current, voltage, and resistance. To generalize, it is possible to identify an equation of the form:

$$P = h(X, Y)$$

which approximates the calibration surface, where X is the first input parameter, Y is the second input parameter, and P is the pressure corresponding to values of the first parameter X and second parameter Y. This equation is then used as a proxy for the multi-dimensional calibration surface to calculate the pressure.

This improvement provides excellent temperature compensation from 0° C. to 50° C. from pressures less than $10^{-4}$ Torr to above atmospheric pressure. It avoids the need to measure power and temperature as is sometimes done. It compensates for all types of ambient temperature change induced errors, such as change in radiation loss, not merely those losses dependent on changes in sensing element to wall temperature changes as is the case in U.S. Pat. No. 4,682,503. The improvement avoids the complexity of having to control the ambient temperature using thermoelectric cooling as described in U.S. Pat. No. 5,347,869. In addition, this improved calibration and operating method automatically compensates for the fact that the temperature coefficient of resistivity will be slightly different for the sensing element at operating temperature than for the compensating element at ambient temperature.

Further Embodiments

Figure 7:
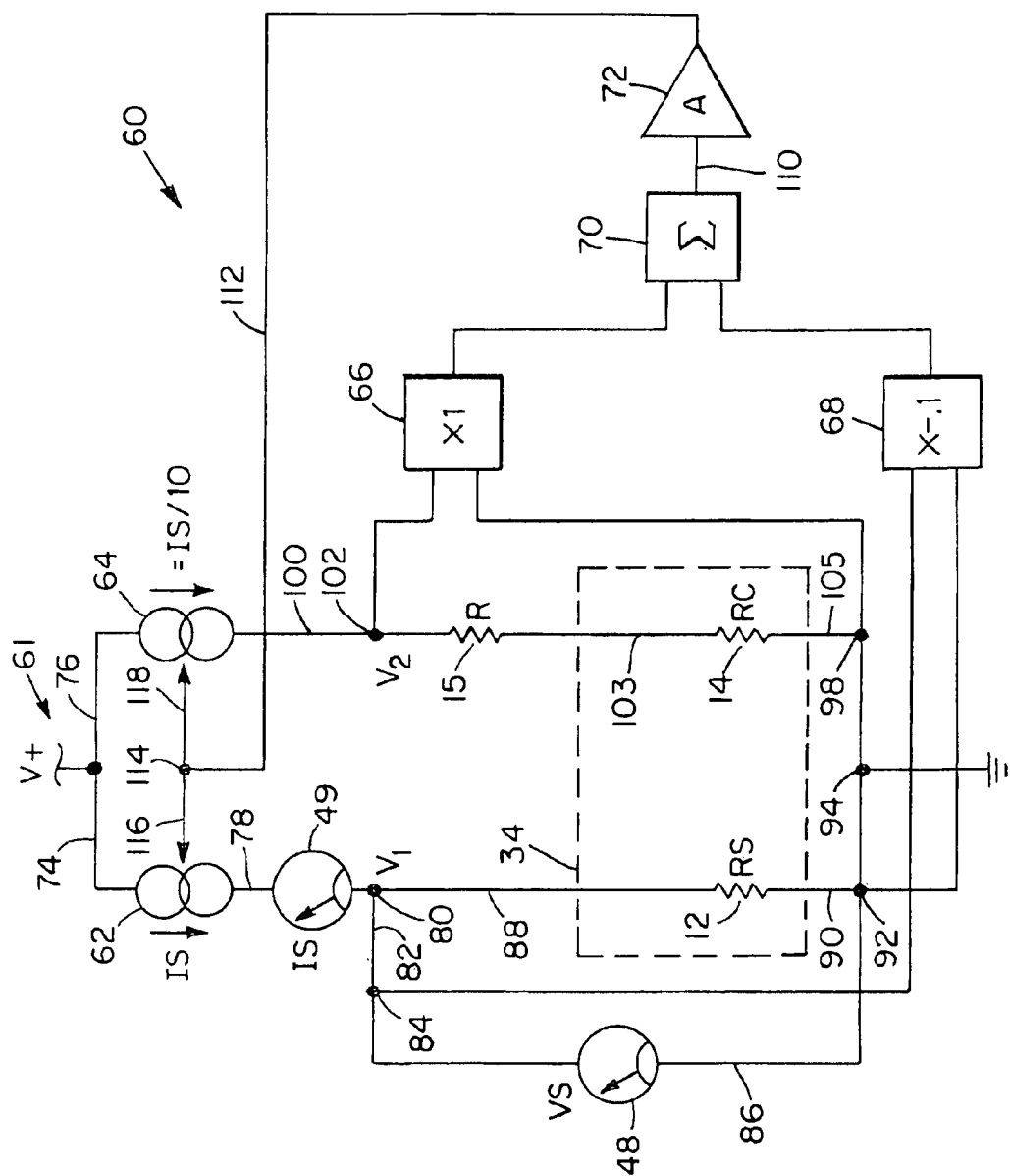
FIG. 7 is a schematic diagram showing another independent heating arrangement for a sensing element according to the present invention.

Referring to FIG. 7, gauge 60 is an embodiment of a gauge that differs from that depicted in FIG. 6 in that it does not employ a Wheatstone bridge. As in FIG. 6, gauge 60 includes a sensing element 12 (having a resistance value RS), a non-temperature-sensitive resistance element 15 (having a resistance R) and a temperature compensating element 14 (having a resistance RC), with elements 12 and 14 being positioned within a vacuum environment 34 in a similar manner or arrangement. Although the circuitry that connects elements 12, 14 and 15 in gauge 60 differs from that in FIG. 6, elements 12, 14 and 15 are utilized in a similar manner as in FIG. 6. For example, sensing element 12 is heated while non-temperature-sensitive resistance element 15 and temperature compensating element 14 are not heated significantly. In addition, the voltage VS across and the current IS through sensing element 12 are measured and utilized to determine pressure in a similar manner.

Gauge 60 includes a power source 61 for supplying power to current sources 62 and 64 via lines 74 and 76, respectively. Current sources 62 and 64 are interdependent and preferably provide DC current to element 12 and elements 14/15, respectively. Current source 64 provides a current of a magnitude or level that is a predetermined fraction of that provided by current source 62. In the example shown in FIG. 7, current source 64 provides $\frac{1}{10}$ the amount of current provided by current source 62.

The current IS provided by current source 62 is directed through sensing element 12 by way of line 78, node 80 and line 88. The fractional current provided by current source 64 is directed through non-temperature-sensitive resistance element 15 and temperature compensating element 14 by way of line 100, node 102 and line 103 (positioned between elements 14 and 15). As in FIG. 6, elements 14 and 15 compensate for ambient temperature changes. Directing a fraction of the sensing current IS through the temperature compensating element 14 makes the temperature rise of the compensating element 14 insignificant relative to that of sensing element 12. In the example depicted in FIG. 7 where the ratio of the sensing current IS to the fractional current through temperature compensating element 14 is a ratio of 10:1, the power dissipated in the temperature compensating element 14 is less than ¹⁄₁₀₀ the power dissipated in sensing element 12 due to the squared relationship of current to power (where Power=I²R). As a result, the temperature rise of compensating element 14 is less than 1%, than that of sensing element 12. Although a current ratio of 10:1 for current sources 62 and 64 is described, other ratios less than or greater than 10:1 may be employed. The current IS is controlled to heat the sensing element 12 to a temperature level at which the resistance RS increases to equal the combined resistance R+RC. It is at that temperature that calibration data defines the environmental pressure. A feedback circuit maintains the current at that level.

Specifically, the voltage $V_2$ across the combined resistance R+RC indicative of the resistance R+RC, is applied through a unity multiplier 66 (connected to nodes 102 and 98) to a summing circuit 70 while the voltage $V_1$ across the resistance RS, indicative of the resistance RS, is applied through a multiplier 68 (connected to nodes 84 and 92) to the summing circuit 70. Since R=V/I, and the current through R+RC is one tenth the current through RS, the voltage across R+RC is one tenth the voltage across RS when the resistances are equal. Therefore, to make a comparison of the voltages to determine whether the resistances are equal, the voltage across RS must be multiplied by one tenth of the multiplier applied to the voltage across R+RC. The multiplier 68 multiplies the voltage $V_1$ by −0.1 to assure that the multipliers have an inverse ratio to the ratios of the current IS and IS/10. The negative multiplier 68 allows the summer circuit 70 to perform a subtraction of the normalized resistance voltages to provide an error signal 110 indicating a difference between the resistances. That difference is amplified in high-gain integrating error amplifier 72 and fed back to control the current level IS. The output of the error-amplifier 72 is fed back in parallel to current sources 62 and 64 via line or feedback loop 112, node 114 and lines 116 and 118 to adjust the level of current provided by current sources 62/64 as necessary. The currents provided by current sources 62/64 are adjusted such that the resistances RS of sensing element 12 and R+RC of elements 15/14 maintain a predetermined equilibrium. In the example shown in FIG. 7, the resistances are matched such that RS=R+RC. Alternatively, other ratios or resistance levels may be employed where RS is less than or greater than R+RC. In addition, although a feed back circuit for controlling current sources 62/64 is preferred, alternatively, such a feedback circuit may be omitted with the database allowing for different voltage ratios. When the feed back circuit is omitted, the response time of the gauge 60 is typically slower.

The current through sensing element 12 is determined by current sensor 49, and the voltage $V_1$ across sensing element 12 due to that current is determined by sensor 48, which is connected to nodes 80 and 92 with lines 82 and 86. Elements 12 and 14 are connected to nodes 92 and 98 by lines 90 and 105, respectively, and line 86 is connected to ground by node 94. Sensor 48 and multipliers 66 and 68 have high input impedences so all current IS flows through sensing element 12. As in the prior embodiment, current and voltage parameters can be used in a data base lookup to determine the pressure to which elements 12 and 14 are exposed.

Gauge 60 is calibrated in a similar manner as that described for the gauge depicted in FIG. 6 where sensing element 12 is exposed to a series of known representative pressures and ambient temperatures spread over the pressure and temperature ranges of interest. The voltage drop across sensing element 12 is measured by voltmeter 48 and the current therethrough is measured by current meter 49 while resistences RS and R+RC are maintained at a predetermined equilibrium for example, RS=R+RC. These values are plotted to provide the three-dimensional data table and surface described in regard to FIG. 6.

As a result, in use, an unknown pressure can be determined by measuring voltage and current across sensing element 12 and then employing the methods described for the gauge of FIG. 6. For example, the values of voltage and current that are measured are compared to the stored calibration data which contains pressure values for particular voltage and current values. Typically, the measured values of voltage and current do not exactly match any of the values contained within the stored data. Consequently, the value of the measured pressure is determined by interpolation of the stored voltage/current/pressure calibration data. Preferably, an approximating equation such as Eq. 27 is employed to perform the interpolation. By storing Eq. 27 in the processor, pressure may be automatically calculated from the measured voltage and current across sensing element 12. As in the gauge of FIG. 6, quantities other than voltage and current may be employed for determining pressure within the scope of the invention.

Figure 8:
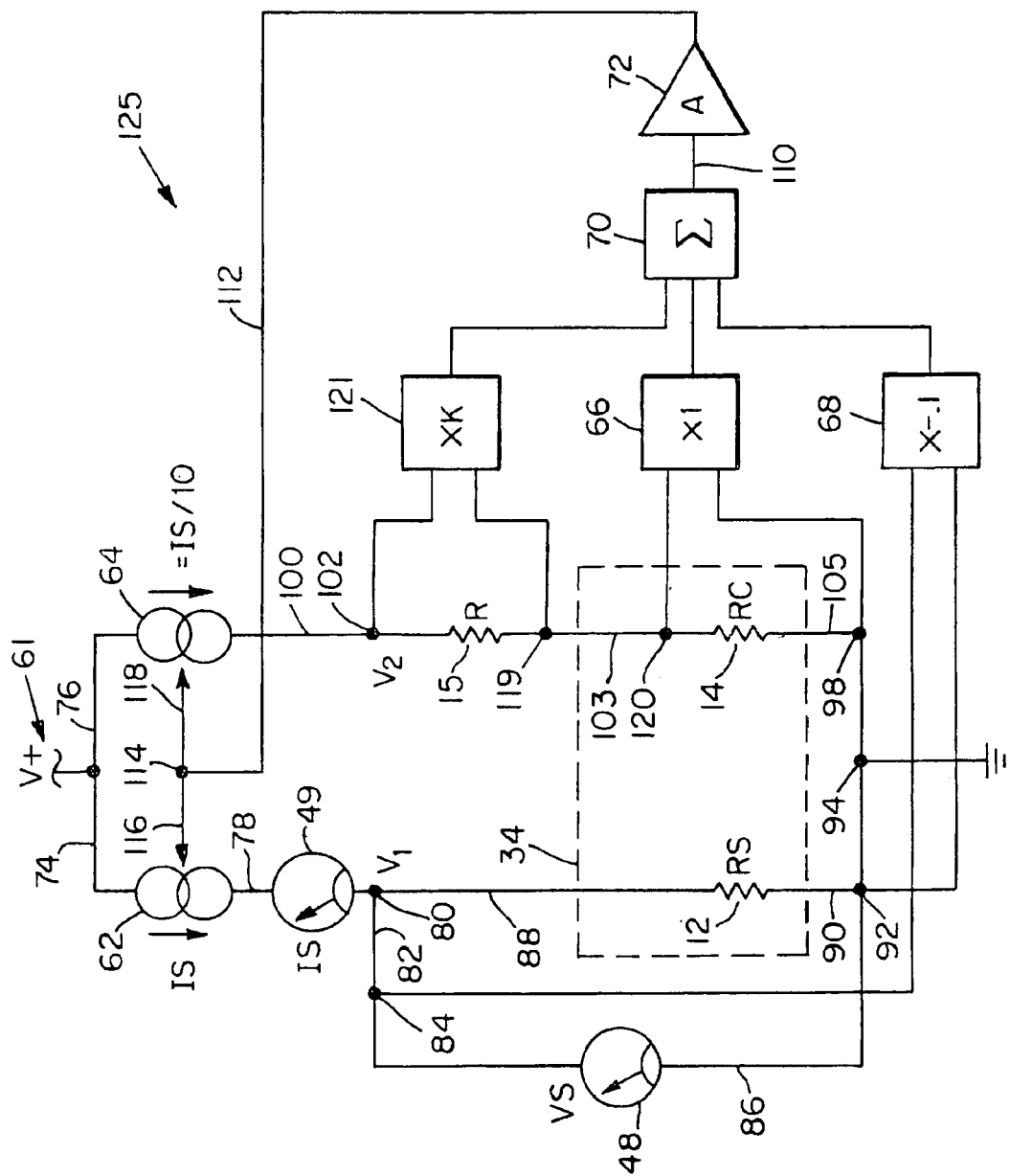
FIG. 8 is a schematic diagram showing yet another independent heating arrangement for a sensing element according to the present invention.

Referring to FIG. 8, gauge 125 is an embodiment of a gauge in accordance with the present invention that differs from gauge 60 (FIG. 7) in that the positive (+) input of multiplier 66 is moved from node 102 to a new node 120 located between elements 14 and 15 as shown. In addition, a third multiplier 121 with gain K is included. Multiplier 121 is connected to node 102 and a new node 119 (located between elements 14 and 15) as shown. In this arrangement, the resistance of line 103 between elements 14 and 15 does not add an uncertain incremental value to the resistance R of element 15. As a result, line 103 can be a lengthy wire if required, and the resistance between nodes 119 and 120 remains substantially inconsequential to the accuracy of gauge 125. This allows element 15 to be positioned in more convenient locations such as on a printed circuit board of an electronics package rather than at the transducer and the resistance of the termination of the compensating element 14 need not be so tightly controlled. Furthermore, positioning element 15 away from the transducer allows element 15 to be in an environment that has a more stable temperature so that unintentional temperature sensitivities are minimized. The value of the resistance R of element 15 can be selected based on cost, convenience, or availability since the voltage drop across element 15 can be multiplied by any arbitrary value K by multiplier 121 to obtain the desired results.

Still further embodiments of the present invention can be configured such that the sensing element 12 and the temperature compensating element 14 are different in resistance as well as length. The sensing element 12 and the temperature compensating element 14 can be configured such that the resistance of the temperature compensating element 14 is slightly less than the sensing element 12, for example, up to about 10% less. It has been found that in some situations, a compensating element 14 which has slightly less resistance than the sensing element 12 can provide further improved ambient temperature compensation of the pressure signal over a compensating element 14 having a resistance matching the sensing element 12.

Figure 9:
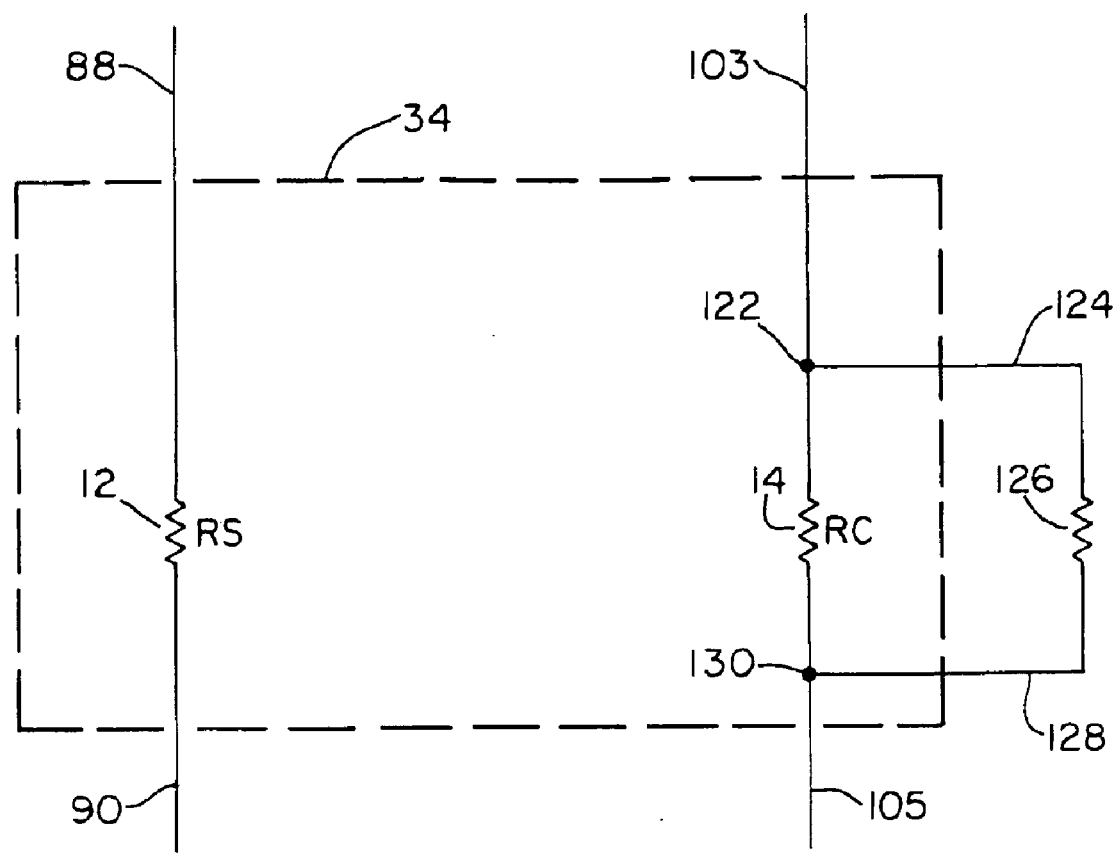
FIG. 9 is a schematic drawing of a portion of the circuit of FIG. 7 having a trim resistor connected in parallel with the compensating element in an embodiment of the present invention.

In one embodiment, where the sensing 12 and compensating 14 elements have equal lengths and resistances, the resistance of the compensating element 14 can be lowered to the desired amount by a trim resistor 126 that is electrically connected in parallel with the compensating element 14, and generally positioned externally to the sensed or measured environment. FIG. 9 depicts an example of a trim resistor 126 connected in parallel with the compensating element 14 shown in the circuit of FIG. 7, where parallel trim resistor 126 is connected to line 103 via line 124, and node 122, and to line 105 via line 128 and node 130. When the parallel trim resistor 126 is in parallel with compensating element 14, the resistor 126 becomes part of compensating element 14. In one embodiment, compensating element 14 is provided with about 4.5% lower resistance than sensing element 12 for providing temperature compensation optimized at about 300 mTorr. The addition of the parallel trim resistor 126 in parallel with the compensating element 14 changes both the temperature coefficient of resistance and the ohms/° C. of the circuit leg of the compensating element 14.

In another embodiment, the compensating element 14 is made of the same material and is generally the same diameter as the sensing element 12 but is slightly shorter in length in order to provide the lower resistance relative to the sensing element 12. The length difference is determined empirically by comparison over a temperature range with a capacitance diaphragm gauge. The length mismatch difference is small enough so that the sensing 12 and compensating 14 elements still have similar temperature response and physical characteristics, but the shorter compensating element 14 provides better temperature compensation. In one embodiment, the compensating element is about 6.4% shorter (about 6.4% less resistance) than sensing element 12, which temperature compensates the sensor voltage curve optimized at about 1 Torr. A shorter compensating element 14 has a temperature coefficient of resistance (ohms/ohm/° C.) that is the same as the sensing element 12 but the ohms/° C. is different.

The optimum length and resistance mismatch between the sensing element 12 and the compensating element 14 can vary between different gauges depending upon the length, position, and spacing of the sensing 12 and compensating 14 elements, as well as the proximity to other components. The length mismatch can be employed in any of the circuits previously described.

A parallel trim resistor 126 can be employed in situations for lowering the resistance of compensating element 14 where the length or resistance of compensating element 14 is less than the sensing element 12 but not to the full extent desired. In addition, if the length or resistance of compensating element 14 relative to sensing element 12 is lower than desired, a parallel trim resistor 126 can instead be placed in parallel with sensing element 12 to reduce the resistance of the sensing element 12 so that the resistance of compensating element 14 is increased relative to the resistance of sensing element 12 to bring the relative resistances into the desired range. In such a case, the parallel trim resistor 126 becomes part of the sensing element 12. Although the parallel trim resistor 126 has been described above as being employed in the circuit of FIG. 7, it is understood that the parallel trim resistor 126 can be employed in any of the other circuits described above.

While this invention has been particularly shown and described with references to preferred embodiments thereof, it will be understood by those skilled in the art that various changes in form and details may be made therein without departing from the scope of the invention encompassed by the appended claims.

For example, features of the different embodiments of the present invention may be substituted for each other or combined. In addition, although gauges 60 and 125 have been described to apply DC current to elements 12, 14 and 15, other embodiments of the present invention include applying AC current to elements 12, 14 and 15. Furthermore, although specific dimensions and specifications have been provided, it is understood that the dimensions and specifications can be varied depending upon the situation at hand.

What is claimed is:

1. A heat loss gauge for measuring gas pressure in an environment comprising:

a resistive sensing element;

a resistive compensating element in circuit with the sensing element and being exposed to a substantially matching environment;

at least one electrical source connected to the sensing element and compensating element for applying current through the elements in a manner to provide independent heating of the sensing element; and measuring circuitry connected to the sensing element and the compensating element for determining gas pressure in the environment to which the sensing element and compensating element are exposed based on electrical response of the sensing element and the compensating element.

2. The gauge of claim 1 in which the sensing and compensating elements have substantially similar temperature response and physical characteristics.

3. A method of measuring gas pressure in an environment comprising:

providing a resistive sensing element;

providing a resistive compensating element that is in circuit with the sensing element and is exposed to a substantially matching environment;

applying current through the sensing element and compensating element from at least one electrical source in a manner to provide independent heating of the sensing element; and with measuring circuitry connected to the sensing element and the compensating element, determining gas pressure in the environment to which the sensing element and compensating element are exposed based on electrical response of the sensing element and the compensating element.

4. The method of claim 3 further comprising providing the sensing and compensating elements with substantially similar temperature response and physical characteristics.

5. A heat loss gauge for measuring gas pressure in an environment comprising:

a resistive sensing element;

a resistive compensating element in circuit with the sensing element and being exposed to a substantially matching environment;

at least one electrical source connected to the sensing element and compensating element for applying current through the elements, the amount of power dissipated in the sensing element being substantially greater than the amount of power dissipated in the compensating element; and measuring circuitry connected to the sensing element and the compensating element for determining gas pressure in the environment to which the sensing element and compensating element are exposed based on electrical response of the sensing element and the compensating element.

6. The gauge of claim 5 wherein the electrical source applies current to heat the sensing element to a temperature at which the resistance of the sensing element matches the combined resistance of the compensating element plus a constant number of ohms.

7. The gauge of claim 5 wherein the sensing element and the compensating element have the same cross sectional dimensions.

8. The gauge of claim 5 in which the sensing and compensating elements have substantially similar temperature response and physical characteristics.

9. The gauge of claim 5 further comprising feedback circuitry for controlling the current through the sensing element and the compensating element.

10. The gauge of claim 9 wherein the compensating element is in series with a non-temperature-sensitive resistive element.

11. The gauge of claim 10 wherein the electrical source applies current to heat the sensing element to a temperature at which the resistance of the sensing element matches the combined resistance of the compensating element and the non-temperature-sensitive resistive element.

12. A method of measuring gas pressure in an environment comprising:

providing a resistive sensing element;

providing a resistive compensating element that is in circuit with the sensing element and is exposed to a substantially matching environment;

applying current through the sensing element and compensating element from at least one electrical source, the amount of power dissipated in the sensing element being substantially greater than the amount of power dissipated in the compensating element; and with measuring circuitry connected to the sensing element and the compensating element, determining gas pressure in the environment to which the sensing element and compensating element are exposed based on electrical response of the sensing element and the compensating element.

13. The method of claim 12 further comprising applying current from the electrical source to heat the sensing element to a temperature at which the resistance of the sensing element matches the combined resistance of the compensating element plus a constant number of ohms.

14. The method of claim 12 further comprising providing the sensing element and the compensating element with the same cross sectional dimensions.

15. The method of claim 12 further comprising providing the sensing and compensating elements with substantially similar temperature response and physical characteristics.

16. The method of claim 12 further comprising controlling the current through the sensing element and the compensating element with feedback circuitry.

17. The method of claim 16 further comprising positioning the compensating element in series with a non-temperature-sensitive resistive element.

18. The method of claim 17 further comprising applying current from the electrical source to heat the sensing element to a temperature at which the resistance of the sensing element matches the combined resistance of the compensating element and the non-temperature-sensitive resistive element.

* * * * *